June 12, 1951 S. HINDS 2,556,425
AIRPORT FUELING MECHANISM
Filed Aug. 23, 1945 6 Sheets-Sheet 1

INVENTOR.
Sherwood Hinds

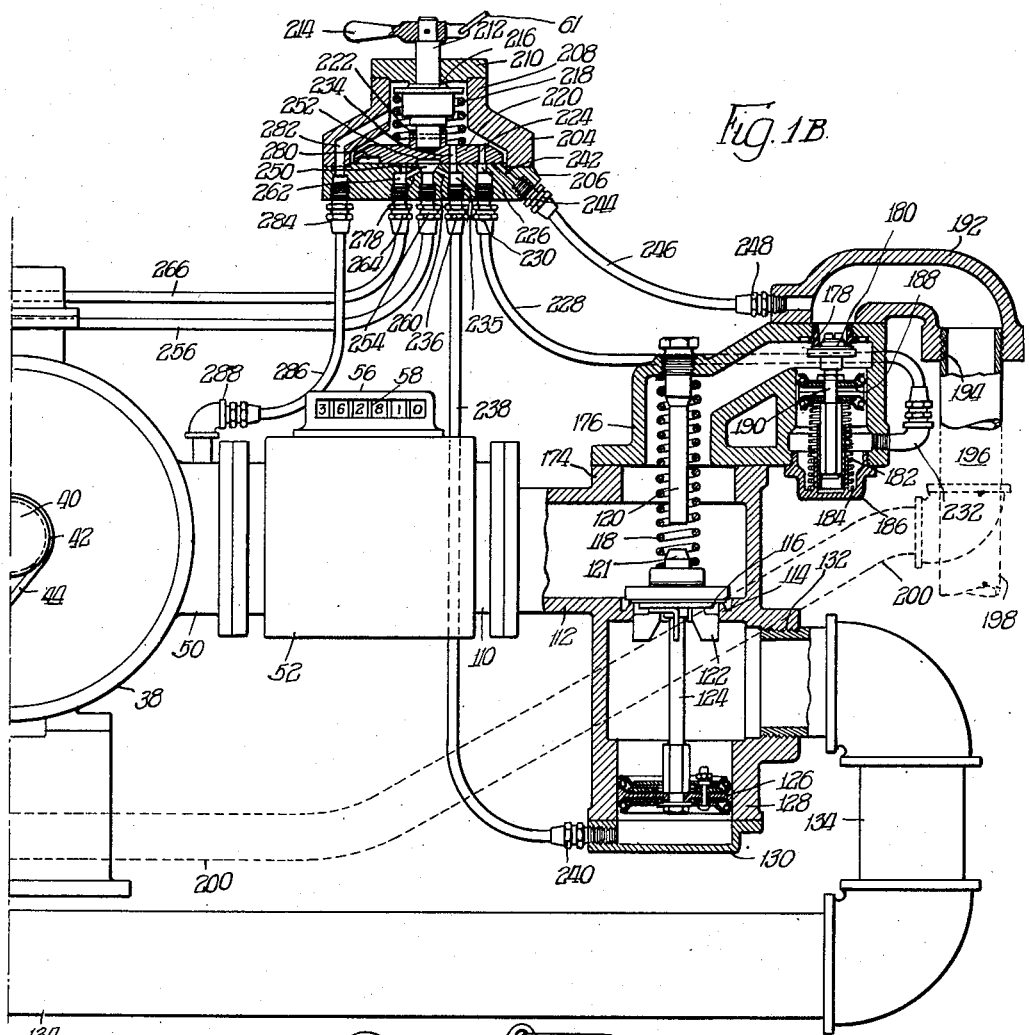
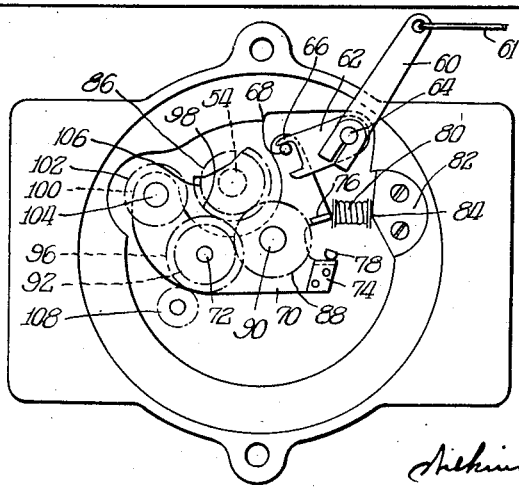

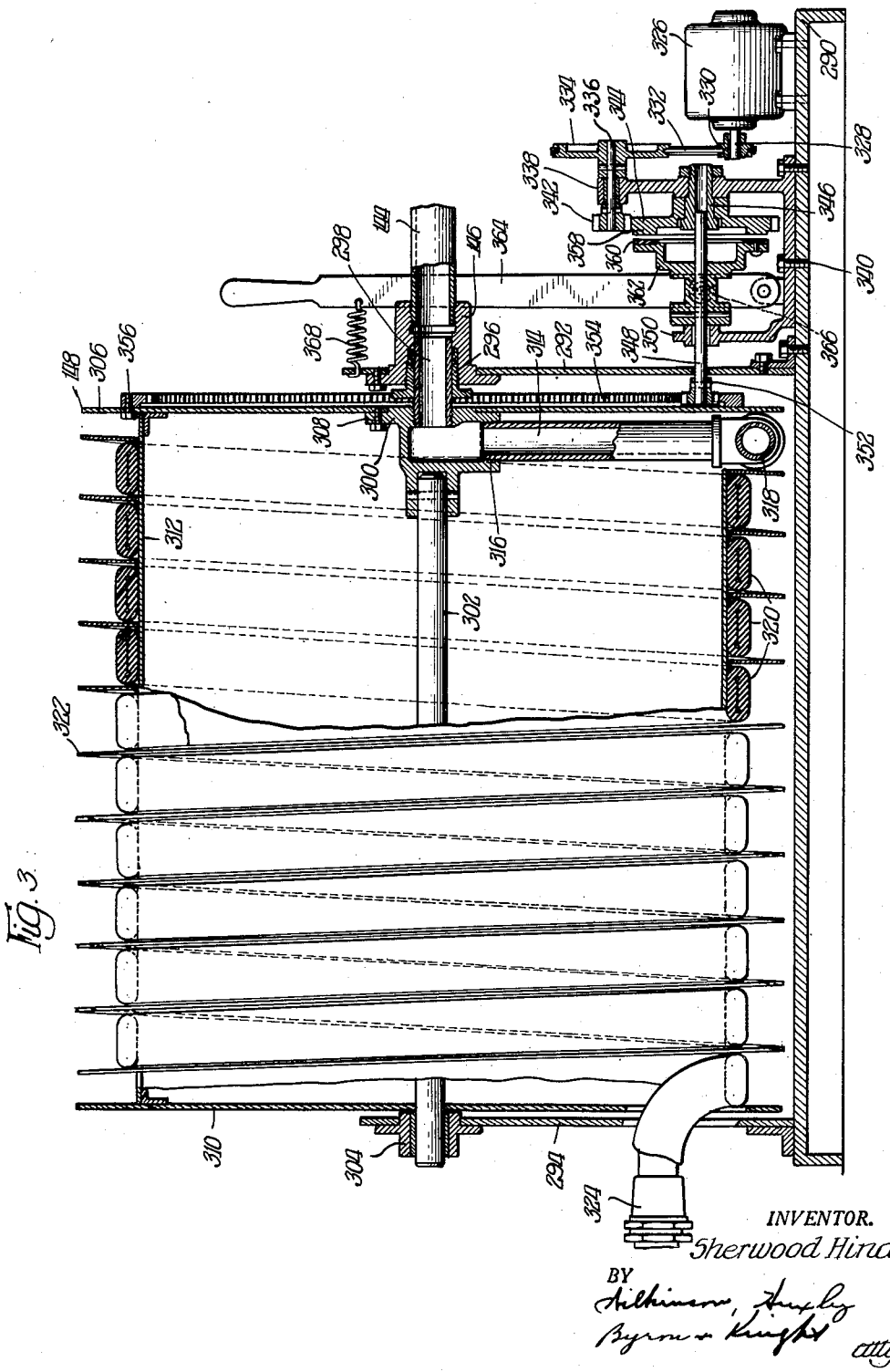

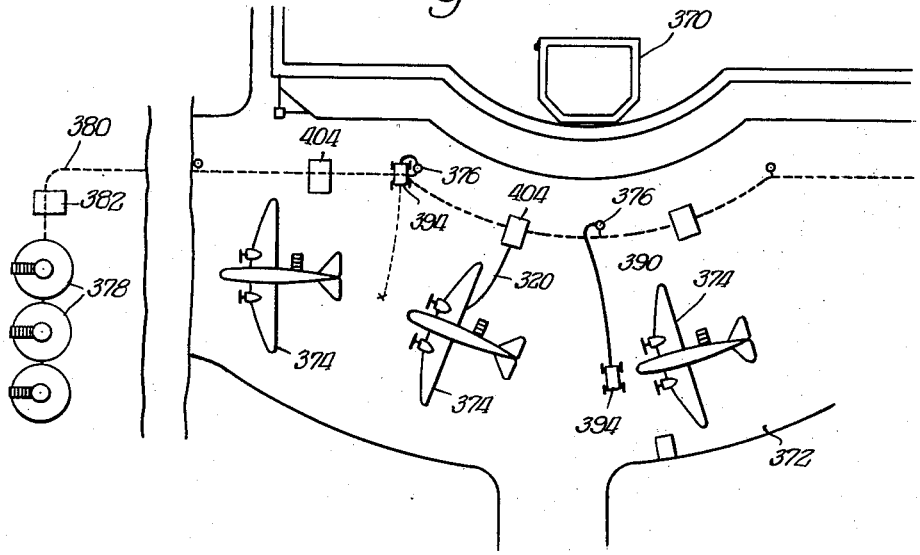
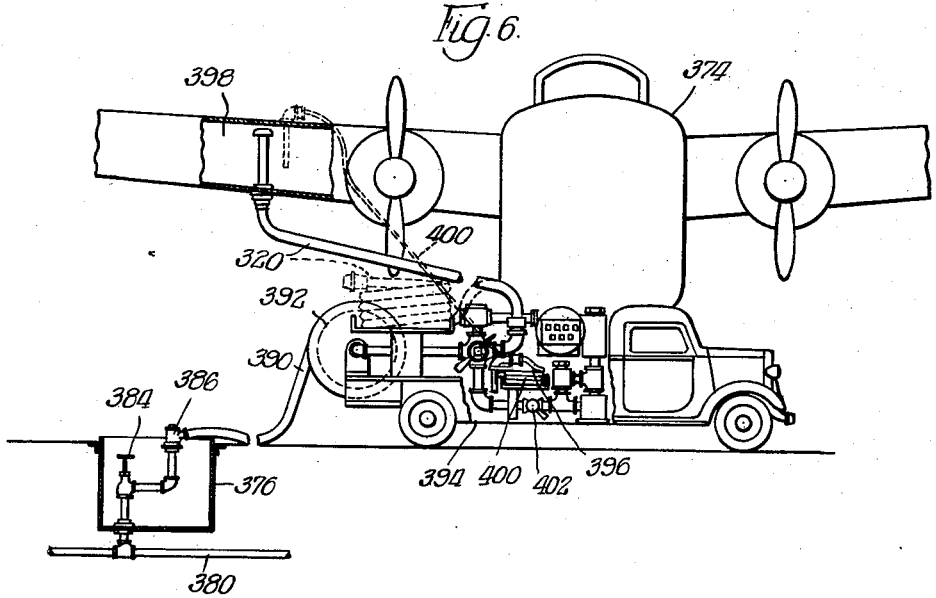

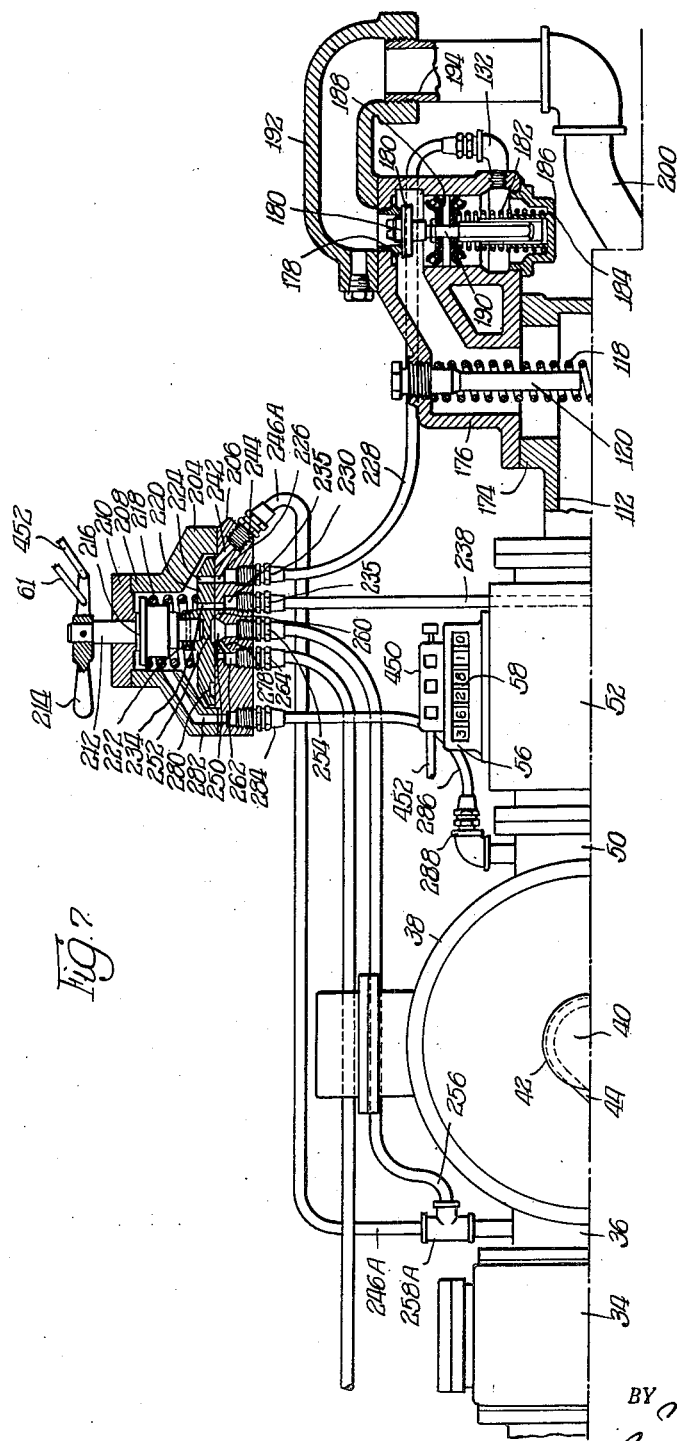

Patented June 12, 1951

2,556,425

UNITED STATES PATENT OFFICE 2,556,425

AIRPORT FUELING MECHANISM

Sherwood Hinds, Columbia City, Ind., assignor to The Wayne Pump Company, Fort Wayne, Ind., a corporation of Maryland Application August 23, 1945, Serial No. 612,233

3 Claims. (Cl. 222—23)

This invention pertains to liquid dispensing apparatus and more particularly to mechanism and apparatus for fueling wherein high delivery can be effected and a long hose readily used and handled, making it readily adaptable for use as an airport fueling apparatus.

For a number of years the so-called fueling pit has been used extensively in airports. This pit system has a source of liquid supply in the form of an underground or overhead storage tank and, by means of a pump, usually located near the source of supply, gasoline under pressure is forced to the fueling pit which houses a meter, control valves, switches and a reel on which fifty or more feet of hose is coiled. To the end of the hose is attached a nozzle for controlling the flow of liquid to the plane. The usual practice is for the plane to taxi to a location at or near the fueling pit. The attendant then withdraws a sufficient length of hose to reach to the fill opening, usually on the top of the wing, and filling is then effected.

A hose containing gasoline under pressure is difficult to handle, not only by reason of the weight involved, but because it is difficult to control the shut-off nozzle when closing against the high presure necessary to force gasoline through the dispensing system. A hose larger than 1½ inches in diameter becomes so unwieldly that it is almost impossible to handle, and since the hose size must be confined to diameters of 1½ inches or less, flow rates are greatly restricted and the objective of the air lines to obtain delivery of 100 G. P. M. upwards is not obtainable.

This pit system has a rather widespread use in airports where planes, smaller than the transport type, are serviced. The commercial air lines have not taken kindly to fueling pits and prefer, instead, to fuel planes from a gasoline truck equipped with power take-off. This system has several advantages over the pit system. The plane can come to rest at any position on the field and the fueling truck is driven to the plane. The pump, which is driven by power take-off mechanism installed as a part of the equipment of the truck, forces gasoline through the meter, hose, and nozzle, and by reason that the tank truck can be positioned rather closely to the plane, it is usually necessary to only withdraw about twenty-five feet of the hose from the reel, and since the pump is so closely associated with the source of supply, faster deliveries are obtained. The objection to this tank truck delivery is, of course, the limited capacity of the truck.

The commercial air lines, planning for the future, are endeavoring to improve the present fueling system. They visualize capacities of 150 G. P. M. as being necessary to quickly complete the fueling of large transport planes. It is obvious that extremely high pressures would result if attempts were made to force 150 G. P. M. through a hose of 1½ inch diameter, and as stated before, it has been found impractical to handle a hose in excess of that diameter. They object, also, to the hose being dragged over the wing of the plane and have considered the possibility of fueling from underneath the wing, making the system a bottom fueling, rather than a top fueling arrangement. Efforts to accomplish bottom fueling have, to date, met with failure, because the valve mechanism developed for insuring against any loss of fuel, after the connection has been broken, has resulted in so much intricate mechanisms as to be considered impractical.

The system described herein is designed to expedite the delivery of fuel to a plane, making it possible to deliver gasoline at a rate of at least 150 G. P. M. with less effort than it now takes to deliver gasoline at 40 G. P. M. It further contemplates the abandonment of the present fueling pit apparatus entirely and dispenses with the costly fueling truck. This is accomplished through the use of a flexible, collapsible hose which is expanded to its true diameter only while gasoline is being delivered to the plane, and which is collapsed to a flattened position with all gasoline withdrawn from the hose before the connection to the fill pipe of the plane is broken. The hose, meter, control valves, and air separator pump may be stored in a cabinet at a selected point or may be carried on a light, small, inexpensive vehicle.

In the herein disclosed system, a storage tank located remotely from the airport may be used, and this storage tank can be either above ground or can be buried underground. In either case, a pump of suitable capacity is positioned near the source of supply and lines are run to the landing field and branched out in several directions. To the ends of the various branches are affixed the control and dispensnig apparatus for the particular branch, which apparatus is readily positioned and readily and easily operated, or the ends of the various branches may be provided with connections to which connections from dispensing apparatus on a vehicle may be coupled.

It is an object of this invention to provide fueling apparatus which is readily adapted to bottom fueling of a receptacle, such as the fuel tank of an airplane.

Another object of the invention is to provide fueling apparatus adapted for high delivery but one which is easily and readily handled and operated.

Another object of the invention is to provide fueling apparatus which may be used to supply fuel to airplanes or other vehicles, and may also be provided with means for withdrawing fuel from the tanks of the airplanes or other vehicles when this is found to be necessary.

Another object of the invention is to provide fueling apparatus wherein the delivery hose is exhausted of fuel after delivery, and is stored dry.

Another object of the invention is to provide fueling apparatus wherein the fueling and defueling, where necessary, is controlled at a point remote from the source of fuel supply.

Another object of the invention is to provide fueling apparatus wherein the delivery hose which is used may be of large diameter, but is moved and stored only in dry condition.

Another object of the invention is to provide fuel dispensing apparatus wherein a portion thereof is mobile for connection to various outlets.

Another object of the invention is to provide fuel dispensing apparatus wherein certain parts thereof are mobile so that a long disconnectable suction hose may be used and a relatively short discharge hose is provided which is readily handled.

Another object of the invention is to provide a fueling system, mobile or stationary, wherein the discharge hose is emptied for storing after a fueling operation, but the amount of liquid emptied from the system is not charged to fueling, so that always a true amount of fuel delivered is registered.

Another object is to provide a control mechanism for an airport fueling system of high capacity which is of light, inexpensive but rugged construction wherein light control mechanism may be used therewith.

Another object of the invention is to provide a control system for airport fueling and the like, wherein after dispensing through the system, the filling hose is evacuated, the system providing means for preventing draining or sucking liquid from the pump and source of supply by pumping action of the vacuumized hose, as where a flooded suction or low suction is utilized.

With these and various other objects in view, the invention may consist of certain novel features of construction and operation as will be more fully described and particularly pointed out in the specification, drawings and claims appended hereto.

In the drawings which illustrate embodiments of the device and wherein like reference characters are used to designate like parts—

Figures 1A and 1B (hereinafter together referred to as Figure 1), together constitute a developed view, partly in section, of filling mechanism embodying the invention, showing the control valve in position for discharge or fueling position;

Figure 3 is a sectional elevation of a hose reel for storing the fueling hose;

Figure 4 is a bottom plan view of the indicating mechanism showing the mechanism for permitting fueling and defueling registrations;

Figure 5 is a plan view, more or less diagrammatic, showing an airport with the fueling system embodying the invention;

Figure 6 is an elevation showing the fueling of a plane by a device embodying one form of the invention;

Figure 7 is a fragmentary elevation of a portion of a developed view similar to Figures 1A and 1B showing a modified form of mechanism embodying the invention; and, Figure 8 is a fragmentary elevation of a portion of a developed view of Figure 1A showing a modified form of mechanism embodying the invention.

Figure 1A:
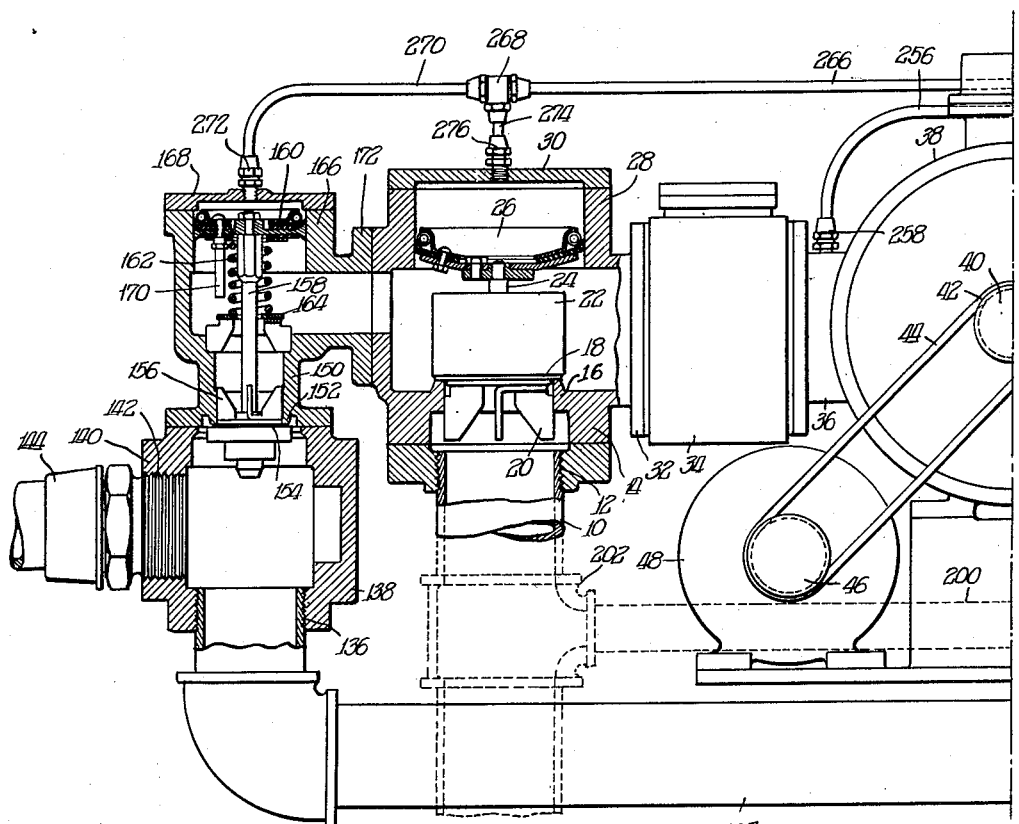

This application is a continuation-in-part of application Serial No. 593,559, filed May 14, 1945, now abandoned.

Referring first of all more particularly to the construction illustrated in Figures 1, 2 and 3, the systems comprise the suction line 10 adapted to be connected to a source of liquid supply (not shown) either directly where the mechanism is disposed in a cabinet, pit, housing or the like, or through a hose where the mechanism is mounted on a vehicle, all as later described. The said suction line 10 is connected as at 12, to the inlet side of the inlet or tank suction valve housing 14, said housing having a seat 16 adapted to be closed by the valve member 18. The valve member 18 is provided with the guiding fins 20 so disposed that when the valve is in open position the flow is not restricted, yet the valve is guided toward fully seated position thereby. A weight 22 is provided on said valve urging the valve toward closed position by gravity though, of course, a spring may be used. The weight is provided with the stem 24 having the piston 26 secured thereto and reciprocally mounted in the cylinder 28, the upper end of said cylinder being closed by cover 30.

The valve housing 14 is connected at as 32 to the strainer 34, the other side of said strainer being connected as at 36 to the inlet or suction side of the pump 38. The pump may be of any suitable type, such as that shown in application Serial No. 541,766, filed June 23, 1944, by Robert J. Jauch and Sherwood Hinds, now Patent No. 2,384,172, issued September 4, 1945, which pump provides an air separator so that air is eliminated before the liquid passes through the meter. The pump is provided with a propeller shaft 40 having the pulley 42 thereon adapted to be rotated by the belt 44 which also passes over the pulley 46 on the drive shaft of the motor or other actuating means 48. In the event the mechanism shown in Figure 1 is carried by a vehicle, the motor 48 may, of course, be replaced by a power take-off wherein the pulley 46 is operated through a clutch by the vehicle motor. The outlet side of the pump is connected as at 50 to the inlet side of the meter 52. Said meter is provided with the meter shaft 54 (Figure 4) which is adapted to operate the indicating mechanism 56.

The indicating means 56 of the indicating mechanism is adapted to both add and subtract, and may be of the well known Veeder-Root type, and in order to operate such mechanism, the lever 60 is provided, adapted to be moved between two positions as by the link 61 pivoted at one end thereto, to oscillate the lever 62 about the pivot point 64. The lever 62 is bifurcated or provided with the jaws 66 adapted to engage a pin 68 disposed on the pivoted frame 70, said frame being pivoted as at 72. The frame is provided with the spaced stops 74 and 76 engageable with the stop 78, a spring 80 being provided between the frame 70 and a support 82 adapted to be biased from dead center 84 to urge selectively the stops 74 and 76 into engagement with the stop 78.

The meter shaft 54 is provided with the gear 86 rotated thereby, said gear being adapted in one position to engage the idler 88 pivoted to the frame 70 as at 90. The idler 88 is adapted to drive the gear 92 pivoted to the frame as at 72, said gear 92 being fixedly provided with the gear 96 which in turn is adapted to drive the gear 98 which drives the indicating mechanism 56. When the frame 70 is biased to the other position where the stop 76 engages the stop 78, the gear 88 will be disconnected from the gear 86. The drive will then be from the gear 86 to the gear 100 which is fixedly provided with the gear 102, both gears being pivoted to the frame 70 as at 104, the gear 102 driving the gear 106, causing the indicator to be driven in a reverse direction. Gear 92 also drives a gear 108 for another portion of the indicating mechanism, such as the tenths, said gear 108 rotating in one direction or the other depending upon the position of the frame 70.

The outlet side of the meter 110 is connected to the hose valve housing 112 which is provided with the valve seat 114 on which the valve 116 is adapted to be seated, said valve being urged toward closed position by means of the spring 118. Preferably a long spring 118 is used so that the tension of the spring does not materially change during the operation of the valve. A stop 120 is provided aligned with the valve stop 121 for limiting the open position of the valve, and the valve is provided with the guiding fins 122 functioning in a manner similar to fins 20 of valve 18. The valve is provided with the valve stem 124 extending downwardly and provided with the piston 126 reciprocally mounted in the cylinder 128 closed by means of the cap 130.

The housing 112 is provided with the outlet 132 connected to the piping 134 which is connected as at 136 to the outlet housing 138, said housing 138 being provided with the outlet 140 connected as at 142 to the piping 144, which in turn is connected to the inlet fitting 146 (Figure 3) of the hose reel assembly indicated generally at 148, to be later described.

The housing 138 is connected to the hose suction valve housing 150, provided with the valve seat 152 on which the valve 154 is adapted to be seated. Said valve is provided with guiding fins 156 and is provided with the upwardly extending piston rod 158 secured to the piston 160, said piston being urged upwardly, or toward valve closed position, by means of the spring 162 interposed between the piston and the washer 164. The piston 160 is reciprocally mounted in the cylinder 166 closed by means of the cap 168. Downward movement of the piston is restricted by means of the stop 170 which in valve open position may engage washer 164. The housing 150 is connected as at 172 to the valve housing 14.

The housing 112 is connected as at 174 to the return valve housing 176 which supports the stop 120 and provides a spring seat for the spring 118. The housing 176 is provided with the valve seat 178 on which the valve 180 is adapted to be seated, said valve being urged toward closed position by means of the spring 182 interposed between the spring seat 184 of the cap 186 and the piston 188 connected by means of the piston rod 190 to the valve 180. Valve 180 controls the flow to the manifold 192 which in turn is connected as at 194 which is connected to the piping 196 which may be directly connected as at 198 to the source of liquid supply, or may be connected as at the piping 200 to the suction pipe 10 as at 202. If the pipe 10 is provided with a foot valve at the source of supply, the pipe 200 cannot be used and it is necessary to use the pipe 198.

The control valve 204 for controlling fueling or defueling, comprises the valve body 206 and the valve cap 208 closed as at 210. The operating shaft 212 extends through the cap and is provided with the operating lever or handle 214, a suitable seal 216 being provided, the seal being urged toward the cap by means of the spring 218 which also urges the valve disk 220 toward the valve body 206. This handle 214 is pivoted to the end of the link 61 remote from lever 60 (Figure 4) so that the handle is interlocked with the register. When the handle is moved for dispensing, the lever 60 is conditioned for adding and when the handle is moved to evacuate the dispensing hose the lever is conditioned for subtracting, each prior to the initiation of the dispensing or evacuating operations, respectively. The shaft 212 is pinned as at 222 to the valve disk whereby it may be rotated by said handle. The valve disk is provided with the through passage 224 adapted to be aligned with the passage 226 which in turn communicates with the pipe 228 through the fitting 230, said pipe being connected through fitting 232 to the housing 176 below the piston 188. The disk 220 is provided with the through passage 234 adapted to communicate with passage 235 which in turn is connected through the fitting 236 to the pipe 238 which is connected through the fitting 240 to the housing 128 below the piston 126.

The body 206 is provided with the passage 242 connected through the fitting 244 to the pipe 246 which in turn is connected through the fitting 248 to the manifold 192 (Figure 1B). If piping 198 cannot be returned to the tank, i. e., if piping 200 is used connected to the pump suction as at 202, then it may be desirable to use pipe 246A (Figure 7) in place of pipe 246, in which case there is no connection to manifold 192, but instead pipe 246A is connected to the pump suction as through fitting 258A to which pipe 256 is now connected instead of fitting 258. The body 206 is provided with the passage 250 aligned with indentation 252 of the disk 220, the passage 250 being adapted to be connected through the fitting 254 to the pipe 256 which in turn is connected through the fitting 258 to the suction side of the pump 38. The passage 250 communicates with the small bleed passage 260 connected to the passage 235. The valve body is also provided with the passage 262 connected through the fitting 264 to the pipe 266 which is connected to the T-fitting 268 which in turn is connected to the pipe 270, connected through the fitting 272 to the cap 168 above the piston 160. The fitting 268 is also connected through pipe 274 and fitting 276 to the cap 30 above the piston 26. A small bleed passage 278 connects passage 250 with the passage 262. The valve disk 220 is provided with the indentation or passage 280 for connecting passages 226 and 242 for the purpose to be later described.

The valve body 206 and the cap 208 are provided with the passage 282 opening at one end in the valve housing above the disk 220 and connected through the fitting 284 to the pipe 286 which in turn is connected through the fitting 288 to the outlet side of the pump 38.

Ports 260 and 278 are bleed ports. In moving the valve from the position shown in Figure 1 towards the position shown in Figure 2, the disk 220 will close the port 235 so that unless the port 260 were provided, the liquid could not escape from below the piston 126 and the valve 116 would be held in open position. Similarly, in moving the valve from the position shown in Figure 2 toward that shown in Figure 1, the port 262 would be shut off and liquid would be retained above the pistons 160 and 26, holding the valve 154 in open position and holding the valve 18 in closed position. With these bleed ports, normal and proper, operation of the valves is permitted, as the liquid will bleed back to the pump suction permitting the springs 118 and 162 and the weight 22 to close their respective valves. By providing these bleed ports, a small amount of liquid is by-passed during operation, which obviates the necessity of providing valves for relieving the pressure under pistons 126, 160 and 26 to obtain the proper operation of the valves controlled thereby.

As before pointed out, the piping 144 is connected to the inlet fitting 146 (Figure 3) of the hose reel assembly 148. This hose reel assembly comprises the base 290 provided with the upstanding supports 292 and 294. The support 292 is provided with the fitting 146 which in turn is provided with the bearing stuffing box 296 which rotatably receives the hollow trunnion 298, one end of which communicates with the pipe 144. The other end of said trunnion is provided with the manifold 300 disposed on the center line of the reel and to which is secured the axle or elongated trunnion 302 supported in the bearing 304 provided on the support 294.

The manifold is provided with the reel end plate 306 secured thereto as at 308 and the opposite end plate 310 is provided adjacent the bearing 304. These end plates are connected by the drum 312. Pipe 314 is connected at one end thereof to the manifold as at 316, the other end of the pipe extending outwardly of the drum and being connected as at 318 to the flexible collapsible hose 320. The drum 312 is provided with the helical hose guide 322 so disposed that the hose will be guided into its supported position on the drum as indicated in Figure 3, wherein no loops of the hose overlie each other. The other end of the hose is provided with the fitting 324 which may be provided with the conventional form of valve controlled nozzle, or a fitting such as shown and described in Patent No. 2,362,559 to Jauch and Sturm, granted November 14, 1944, for Airport Fueling Mechanism, or such as shown in application Serial No. 593,558, filed May 14, 1945, by Jauch, Sturm, and Hinds for Airport Fueling Mechanism.

In order to retrieve the hose as by rotating the drum, a motor 326 may be provided suitably controlled, the motor being shown secured to the support 290 and having a drive shaft 328 provided with the pulley 330, a belt 332 passing around said pulley and the pulley 334 mounted on shaft 336, which is pivoted to the support 338 fixed as at 340 to the base 290. It is, of course, understood that in the event the reel is mounted on a vehicle such as a truck, the motor 328 may be replaced by a motor take-off. The shaft 336 is provided with the pinion 342 meshing with the gear 344 rotatably mounted on the bearing 346 fixed to the support 338. The bearing 346 also serves as an internal bearing for the shaft 348 rotatably mounted in a suitable bearing on the support 350 which may be part of the support 338.

The shaft is provided with the pinion 352 meshing with the internal gear 354 fixed as at 356 to the reel end plate 306. The gear 344 is provided with the clutch face 358 adapted to be engaged by the clutch plate 360 disposed on the clutch member 362. The clutch member 362 is shown suitably secured to the shaft 348 and is adapted to be moved by the lever 364 having engagement therewith as at 366, said lever being urged toward clutch open position by means of the spring 368 connected at one end to the lever and at the other end to the support 292. In this case then, the shaft 348 slides and the pinion 352 is made wide enough to stay in engagement with the gear 354. Of course, the shaft 348 could be disposed so as to be rotatable only in which case member 362 would be splined to said shaft. Thus operation of the motor 326 causes rotation of the member 344 and if the lever 364 is moved toward the right as viewed in Figure 3, clutch member 362 will be rotated causing rotation of the pinion 352 and gear 354, causing the reel to be rotated to wind or store the hose thereon.

In Figure 5 there is illustrated an adaptation of the invention to an airport which is indicated generally at 370. The airport is provided with the runway 372 for the planes 374. Adjacent the runway there may be provided pits 376 supplied from storage tanks 378 through the flow line 380. Fuel may be supplied from the tanks from a suitable pumping unit, indicated generally at 382. Within the pits 376 a valve 384 is provided having a connecting fitting 386 thereon adapted to be connected to a hose 390 which is carried on a suitable reel 392 provided on the truck 394. This truck 394 is provided with the system 396 which has been described in Figures 1 to 4 inclusive. In this case, instead of the reel 148 being shown, the dispensing hose 320 is shown coiled in dotted lines and in fueling position in the full lines, and is shown adapted for bottom filling of the wing tank 398 of the plane. A defueling hose shown in dotted lines at 400 and stored in full lines, is adapted to be connected through a suitable valve 402 to the pump suction, as described in said patent No. 2,362,559, the defueling liquid passing through the meter and causing subtracting registration. Of course the mechanism illustrated in Figures 1 to 4 inclusive may also be stored in cabinet 404 likewise supplied from the line 380, in which case the hose 320 may be run directly to the plane as shown in Figure 5. It may not be necessary to use a reel with the fueling hose 320 as the hose 390 may be connected at 386 and then the truck driven to the plane to be fueled so that only a relatively short length of hose 320 may be necessary to be handled in which case it may only be necessary to stack the hose and not reel it.

Assuming it is desired to fuel a plane or supply fuel to any container, the hose 320 is connected to the fuel tank or container through the suitable fitting or nozzle attached to the fitting 324, and the valve 204 is positioned as illustrated in Figure 1. The pump 38 is operated either through a power take-off or the separate motor 48 and the valve 18 will be opened by suction, because the pressure (suction) on each side of the piston 26 is equal, so, therefore, the full value of the suction is used to overcome the weight 22.

Liquid then passes through the meter 52 and is recorded in a fueling direction by the indicator, and then passes into the housing 112. Pump pressure is supplied through the pipe 286, passage 282, pipe 238 to the cap 130 below the piston 126 causing the piston to open the valve 116. The area of the piston 126 is greater than that of the valve 116 permitting the piston to open the valve inasmuch as the pressure supplied on the outlet side of the meter is the same as that supplied through the pipe 238.

No liquid can pass through the pipe 196 as the valve 180 will be closed. The valve 180 will be retained in closed position due to the fact that the liquid pressure supplied through pipe 228 is the same below the piston 188 as above said piston. Valve 116 being opened, the liquid will pass through pipe 134 through housing 138 to the hose 320 through pipe 144.

The hose 320 may have been all withdrawn from the drum 312 to be placed in fueling position or may have been only partially withdrawn. In the latter case, as the hose fills with liquid the reel will back up slightly, as it is free to do so because it is declutched from the motor. In retrieving the hose after the liquid has been exhausted therefrom, enough slippage between the hose and drum will occur to permit the collapsed hose to sufficiently hug the reel.

Figure 2:
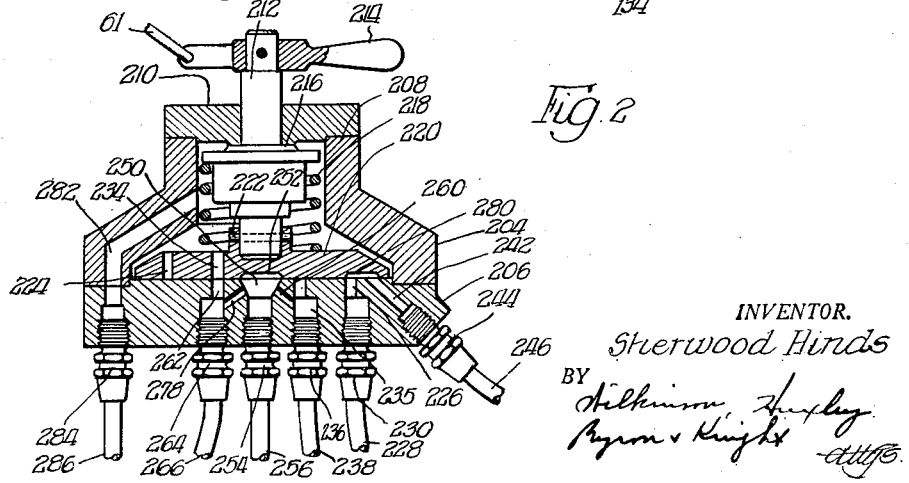
Figure 2 is an enlarged fragmentary sectional elevation of the valve shown in Figure 1B, showing the position of the valve in defueling position.

After a fueling operation, when it is desired to withdraw liquid from the hose so that it may be stored as on the reel shown in Figure 3, and so that the connection between the hose 320 and the fuel tank may be broken without spillage, the discharge valve is moved from the position shown in Figure 1 to that shown in Figure 2. In this position the valve disk 220 is shifted so that pump pressure from the pump discharge is supplied through pipe 286, and port 262 to the pipe 266 causing the pump pressure to act on the top of pistons 26 and 160. The pressure on the piston 26 plus the weight 22 will cause the valve 18 to close. The pressure on the piston 160 will cause the valve 154 to open, connecting the pipe 144 to the pump suction through housing 166. Liquid from the hose will then be pumped by the pump through the meter 52 which has been set by movement of the lever 60 in its other position, i. e., subtracting position, so that the liquid passing through the meter will subtract from the indicator. The liquid will then pass into the housing 112. The port 235 having been disconnected by movement of the valve disk 220 from the pump pressure, the valve 116 will close by the pump pressure on the valve and the spring 118, and the liquid below the piston 126 will bleed out through pipe 238, ports 235 and 260 and pipe 256 to the pump suction.

Valve 180 will then be open as the pressure below the piston 188 will bleed out of the pipe 228, through ports 226 and 242, and through pipe 246 to the discharge through housing 192 so that the discharge pressure of the pump will cause the piston 188 to open the valve 180, as the area of the piston is greater than the area of the valve. In the case of the system shown in Figure 7 the pump suction will also act below the piston 188 urging the piston downwardly aided by the differential in pressure between the upper side of piston 188 and valve 180. Liquid will then pass into pipe 198 (Figure 1) and be returned to the source of supply or if pipe 198 cannot be returned to the source of supply and pipe 200 is used (Figure 7) the liquid is directly returned to the pump suction.

When the liquid is exhausted from the hose, it will be flattened as the nozzle valve (if a nozzle is used) will be closed, or the valve in the vehicle tank fill pipe will be closed. For the details of such valve and fill pipe see said Patent No. 2,362,559, Jauch et al. The hose then is in condition to be stored as by reeling operation of the reel shown in Figure 3 and previously described.

With the type of control valve 204 used herein a very light and sensitive valve can be used due to bleeds 260 and 278. It is not then necessary to use a heavy expensive biased valve. Hard acting four-way valves are eliminated and consequently a light register may be employed and one which may consequently use a light settable preset indicated at 450 interlocked as by rod 452 to handle 214 to render system inoperative. This is readily done as handle 214 is only moved through 90° for its control. Therefore its first quarter movement (about 22½°) would be to stop discharge as valve 116 would be closed. The second quarter movement would be to reverse the register by moving the lever 60 (Figure 4) through link 61. The third quarter movement would be to lock the valve 18 in closed position and the final quarter movement would be to open valves 180 and 164.

Figure 8:
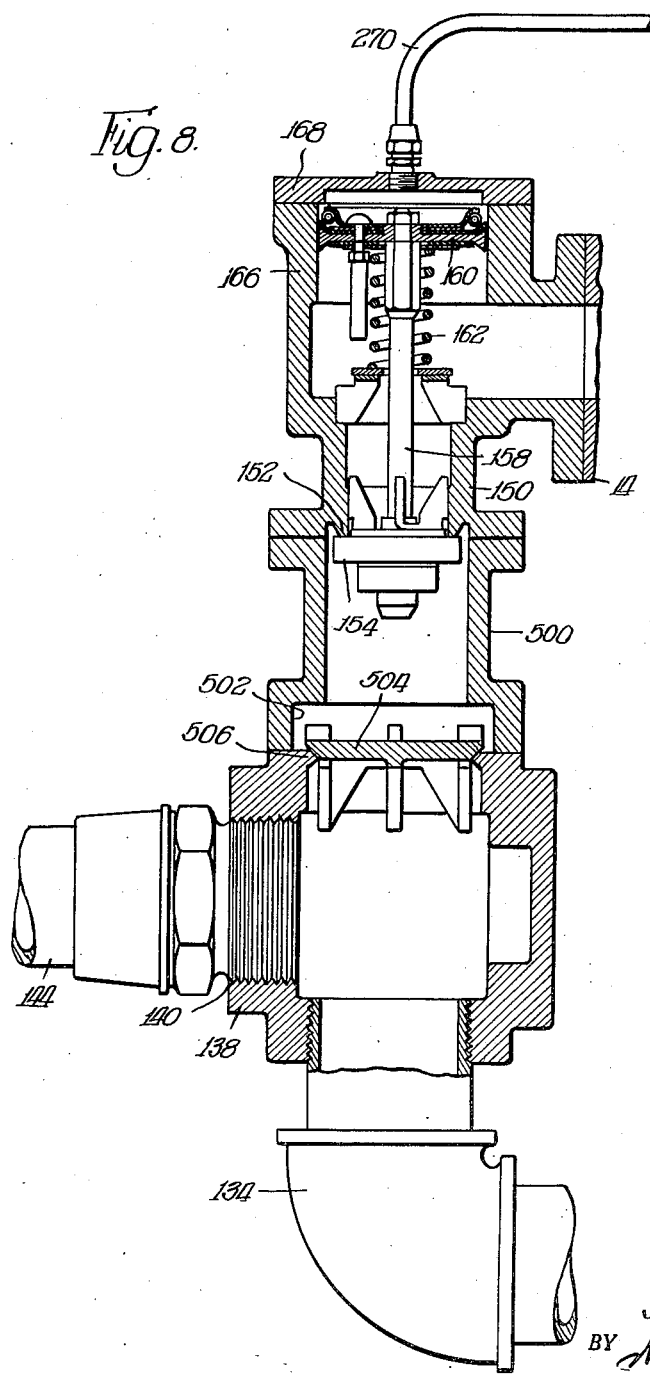

In the construction shown in Figure 8, there is shown a modification wherein a check valve is interposed between the flexible discharge hose and the suction valve housing 150, it being understood that the operating mechanism for the remainder of the system is similar to that shown in Figures 1A, 1B and 7. In this construction the outlet housing 138 is provided with the outlet 140 connected to the piping 144, which in turn is connected to the inlet fitting 146 (Figure 3) of the hose reel assembly. The housing 138 is connected to the hose suction valve housing 150 through housing 500, said housing having a valve recess 502 for the check valve 504, which is preferably of resilient material and seats on the check valve seat 506 provided on housing 138. As before, housing 150 is provided with the valve seat 152 on which the valve 154 is adapted to be seated. Said valve is provided with the upwardly extending piston rod 158, as already described, secured to the piston 160 which is urged upwardly towards valve closed position by the spring 162. Piston 160 is reciprocally mounted in the cylinder 166, closed by the cap 168, the piston being controlled through pipe 270. Housing 150 is connected to valve housing 14 as at 172 and housing 138 is connected to pipe 134 as described.

Frequently, the systems shown are connected to a source of supply wherein a flooded suction is provided, or a low suction is provided, and when the pump is rendered inoperative, there will be a balance of pressure on either side of piston 160, and also piston 26 (Figure 1A), and thus, there will be a tendency for the liquid to leak back past valve 154 as the pressure of liquid from the flooded suction would tend to raise valve 18 (Figure 1A), causing the liquid to seek the hose and tend to fill the hose. This would give an undesirable condition, and, therefore, the valve 504 is provided, which, being a check valve, will seat toward the hose and prevent liquid from being supplied in an unauthorized manner to the hose. The valve 504 is preferably of resilient construction so that it is possible to readily open valve 154, in an authorized manner, even though a column of liquid substantially fills valve housing 500.

It is to be understood that this application is not to be limited by the exact embodiments of the device shown, which are merely by way of illustration and not limitation as various and other forms of the device will, of course, be apparent to those skilled in the art without departing from the spirit of the invention or the scope of the claims.

I claim:

1. In liquid dispensing apparatus, the combination of a flow line adapted to be connected to a source of liquid supply, an inlet valve housing having an inlet connected to said flow line, and an outlet, a valve in said housing closing toward said flow line, means urging said valve to closed position, said housing having a cylinder, a piston in said cylinder connected to said valve, a pump the suction side of which is connected to the outlet of said housing a meter the inlet side of which is connected to the pump outlet, a reversible counter driven by said meter, selecting means for controlling operation of said counter whereby said counter either adds or subtracts the amount of liquid passing from the inlet to the outlet of the meter, a hose valve housing having an inlet connected to the outlet of said meter, said hose valve housing having an outlet, a valve in said hose valve housing closing toward said outlet, said hose valve housing having a cylinder, a piston in said cylinder connected to said valve, means for urging said last named valve to closed position, said hose valve housing having a continuously open outlet continuously connected to the inlet of said hose valve housing, a return valve housing having an inlet connected to said last named outlet, said return valve housing having an outlet, a valve in said return valve housing closing in the direction of said outlet, means for urging said last named valve to closed position, said return valve housing having a cylinder, a piston in said cylinder connected to said last named valve, a connection between said return valve housing outlet and the source of supply, an outlet housing having an inlet connected to the first named outlet of said hose valve housing, said outlet housing having an outlet adapted to be connected to a discharge hose, said outlet housing having an outlet, a hose suction valve housing having an inlet connected to the last named outlet of said outlet housing, a valve between said last named housings seated toward the inlet of said hose suction housing, means urging said valve to closed position, said hose suction housing having a cylinder, a piston in said cylinder connected to said valve, and a control valve for controlling the operation of said other valves, said control valve comprising a housing having ports, a first port being connected to the pump suction, a second port being connected to the pump outlet, a third port being connected to the cylinder of said inlet valve housing on the side of the piston opposite to the valve thereof, said third port being also connected to the cylinder of said hose suction valve housing on the side of the piston opposite to the valve thereof, a fourth port being connected to the cylinder of said hose valve housing on the side of the piston opposite to the valve thereof, and a fifth port being connected to the cylinder of the return valve housing on the side of the piston opposite to the valve and a sixth port connected to the outlet of the return valve housing, a bleed connection between said first and third ports, a bleed connection between said first and fourth ports, a valve disk in said control valve housing, and means for moving said disk between two positions, said disk being so constructed and arranged that when it is moved to first position the second port is connected to the fourth and fifth ports, and when the disk is moved to second position the second port is connected to the third port, and the fifth and sixth ports are connected, the valve in the first position causing the pump suction to bleed from the cylinder of the inlet valve housing and from the cylinder of the suction valve housing to permit closing of the valves connected to the pistons in said cylinders, and causing the pump pressure to act on the pistons in the cylinders of the hose valve housing and the return valve housing to open the valve of the hose valve housing and close the valve of the return valve housing whereby liquid is pumped through the meter to the outlet housing and discharge hose, the selecting means being disposed so that said meter operates the counter in an adding direction, the disk being in the second position causing the pump suction to bleed from the cylinder of the hose valve, permitting closing of said valve, and causing pump pressure to be supplied to the cylinder of the inlet valve housing permitting closing of the valve therein and causing pump pressure to be supplied to the cylinder of the hose suction valve housing opening the valve connected to the piston of said outlet housing, the connection between ports five and six permitting a reduction in pressure in the cylinder of the return valve housing permitting the valve thereof to open whereby liquid passing from the hose passes through the meter and is returned to the source of liquid supply, the selecting means being disposed so that the counter operates in a subtracting direction.

2. In valve mechanism, the combination of a housing comprising a base member and a cover member, a valve disk rotatable on said base member, means connected to said disk and extending outwardly of said housing for rotating said disk, a first passage for connecting a source of fluid supply to said housing and supplying fluid to the housing to one side of said disk, a second passage communicating with said disk on the other side thereof for conducting fluid from the housing, third, fourth, fifth and sixth passages communicating with the valve disk on said other side thereof, bleed means between said second and third and fourth passages, said valve disk having means so constructed and arranged that when the valve is in one position, the first, fourth and fifth passages are connected, and when the disk is in another position the first and third passages are connected and the fifth and sixth passages are connected.

3. In valve mechanism, the combination of a housing comprising a base member and a cover member, a valve disk rotatable on said base member, means connected to said disk and extending outwardly of said housing for rotating said disk, a first passage for connecting a source of fluid supply to said housing and supplying fluid to the housing to one side of said disk, a second passage communicating with said disk on the other side thereof for conducting fluid from the housing, third, fourth, fifth and sixth passages communicating with the valve disk on said other side thereof, bleed means between said second and third and fourth passages, said valve disk having means so constructed and arranged that when the valve is in one position, the first, fourth and fifth passages are connected, and the third and fourth passages bleed to the second passage, and where the disk is in another position the first and third passages are connected and the fifth and sixth passages are connected, and the third and fourth passages bleed toward said second passage.

SHERWOOD HINDS.

REFERENCES CITED

The following references are of record in the file of this patent:

UNITED STATES PATENTS

| Number | Name | Date |
|---|---|---|
| 1,506,517 | Dowrelio | Aug. 26, 1924 |
| 1,905,094 | Hirvonen | Apr. 23, 1933 |
| 2,017,345 | Granberg | Oct. 15, 1935 |
| 2,108,182 | Searle | Feb. 15, 1938 |
| 2,160,741 | Jensen et al. | May 30, 1939 |
| 2,422,758 | Temple | June 24, 1947 |